$^{(12)}$ United States Patent
Chen et al.

(10) Patent No.: US 12,407,567 B2
(45) Date of Patent: Sep. 2, 2025

(54) DYNAMIC DEVICE PERSONA IDENTIFICATION IN A NETWORK

(71) Applicant: Hewlett Packard Enterprise Development LP, Spring, TX (US)

(72) Inventors: Chinlin Chen, Cupertino, CA (US); Uyen T. Chau, Roseville, CA (US); Faraz Ahmed, Santa Clara, CA (US); Lianjie Cao, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 52 days.

(21) Appl. No.: 18/498,777

(22) Filed: Oct. 31, 2023

(65) Prior Publication Data

US 2025/0141736 A1    May 1, 2025

(51) Int. Cl.
*H04L 41/0803* (2022.01)
*H04L 41/08* (2022.01)

(52) U.S. Cl.
CPC ...... *H04L 41/0803* (2013.01); *H04L 41/0886* (2013.01)

(58) Field of Classification Search
None
See application file for complete search history.

(56) References Cited

U.S. PATENT DOCUMENTS

| 9,007,978 | B2 | 4/2015 | Bejerano et al. |
| 9,332,054 | B2 | 5/2016 | Wilson et al. |
| 9,356,908 | B2 | 5/2016 | Velayudhapillai et al. |
| 9,824,080 | B2 | 11/2017 | Kok et al. |
| 10,110,602 | B2 | 10/2018 | Tomasso |
| 11,483,293 | B1 | 10/2022 | Spain et al. |
| 2008/0025234 | A1* | 1/2008 | Zhu .......... H04L 41/26 370/256 |
| 2008/0310421 | A1* | 12/2008 | Teisberg ........ H04L 41/12 370/395.53 |

(Continued)

FOREIGN PATENT DOCUMENTS

WO    2014/033695 A1    3/2014

OTHER PUBLICATIONS

Aruba, "VSF", available online at <https://www.arubanetworks.com/techdocs/AFC/610/Content/afc61olh/vsf.htm>, 2022, 2 pages.

(Continued)

*Primary Examiner* — June Sison
(74) *Attorney, Agent, or Firm* — Yao Legal Services, Inc.

(57) ABSTRACT

A network management system (NMS) that can provision and manage a network is provided. During operation, the NMS can determine, for a respective network device in the network, connectivity information indicating how the network device is connected within the network and a device profile of the network device. The NMS can then determine a connectivity tier of the network device in the network based on the connectivity information. The connectivity tier can correspond to a placement of the network device in a hierarchy of network devices in the network. The NMS can select a device persona associated with the connectivity tier. Here, the device persona indicates specification and configurations for the network device. The NMS can send, to the network device, configuration information that configurates the device persona on the network device.

20 Claims, 8 Drawing Sheets

(56) References Cited

U.S. PATENT DOCUMENTS

| | | | |
|---|---|---|---|
| 2013/0028136 A1* | 1/2013 | Black | H04L 12/4641 |
| | | | 370/254 |
| 2020/0106675 A1* | 4/2020 | Sirton | H04L 41/0806 |
| 2020/0302319 A1 | 9/2020 | Dawson et al. | |
| 2020/0302320 A1 | 9/2020 | Dawson et al. | |
| 2020/0389477 A1* | 12/2020 | Ambrosi | H04L 41/142 |
| 2020/0394169 A1 | 12/2020 | Bhaskar et al. | |

OTHER PUBLICATIONS

Github, "arangodb/arangodb", available online at <https://github.com/arangodb/arangodb>, 2023, 5 pages.

HPE, "Aruba Virtual Switching Extension (VSX)", available online at <https://www.arubanetworks.com/resource/aruba-virtual-switching-extension-vsx/>, 2023, 8 pages.

HPE, "HPE Aruba Networking Central", available online at <https://www.arubanetworks.com/products/network-management-operations/central/>, 2023, 6 pages.

Wikipedia, "Link Layer Discovery Protocol", available online at <https://en.wikipedia.org/wiki/Link_Layer_Discovery_Protocol>, 2023, 4 pages.

* cited by examiner

DYNAMIC DEVICE PERSONA IDENTIFICATION IN A NETWORK

BACKGROUND

A network device, such as a switch, in a network may support different protocols and services. Furthermore, the network device may be placed at different tiers in a hierarchy of devices in the network. Consequently, the protocols and services supported by individual network devices in the network may vary.

BRIEF DESCRIPTION OF THE FIGURES

In the figures, like reference numerals refer to the same figure elements.

DETAILED DESCRIPTION

Figure 1:
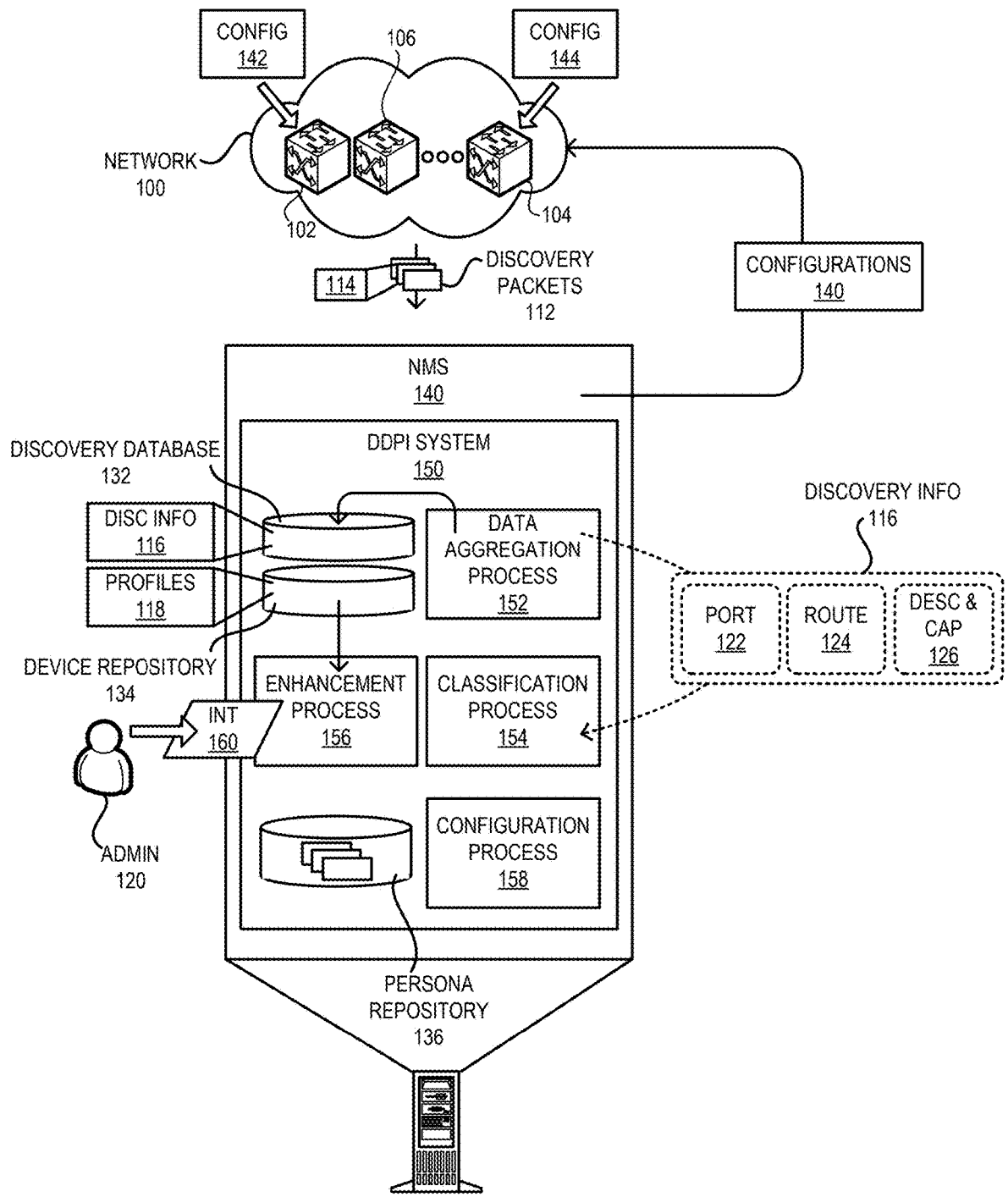
FIG. 1 illustrates an example of a dynamic device persona identification (DDPI) system discovering respective personas of network devices in a network, in accordance with an aspect of the present application.

A network can facilitate data exchange for a variety of applications running on physical and virtual devices. Such applications have brought a progressively increasing amount of network traffic. As a result, network devices, such as switches, are often built with versatile capabilities. To do so, a network device may support different protocols and services. Furthermore, the network device can participate in different types of networks while operating in different roles. For example, the network device can operate as a participating switch in a distributed virtual switch (DVS) where a plurality of participating switches can operate in conjunction with each other to facilitate the operations of the DVS. While operating as a participating switch in a DVS, the network device can also operate as an access switch that connects end devices (or user devices) to the network.

Since each network device in the network may support different types of operations for different roles, providing automated configuration to the network devices can include determining corresponding personas for the network devices. The persona can be a "template" set of configurations applicable to the same category of network devices (i.e., the network devices that are expected to behave in the same manner). Determining a persona for individual network devices may require extensive analysis. Traditionally, such an analysis is performed by a user, such as an administrator. For example, the administrator can configure each network device of the network based on the topology (e.g., how the network device is connected in the network) and the persona of the network device. Therefore, facilitating automatic configurations to a large network with a significant number of network devices can be challenging.

The aspects described herein address the problem of dynamically identifying the persona for a network device in a network by (i) determining how the network devices are connected to each other in the network; (ii) classifying the network device to a connectivity tier based on a number of connections via the network device; and (iii) selecting a persona corresponding to the connectivity tier for the network device. The connectivity tier can indicate the placement of the network device in a hierarchy of network devices in the network (e.g., at the access, aggregation, or core tier). By matching the connectivity tier of the network device to a corresponding persona, the network device can be dynamically allocated with the persona that allows it to efficiently operate at the connectivity tier.

With existing technologies, to deploy a network, the administrator can connect the network devices with each other in the network. Based on the connections, the network devices can logically couple to a network management system (NMS), such as a network orchestrator, and initiate communication with the NMS. A logical connection can span a number of nodes, links, and networks (e.g., via the cloud). The NMS can provision and manage the network devices of the network using the corresponding logical connections. Being logically coupled to the NMS for provisioning and management can be referred to as "onboarding."

The administrator can then configure, via the NMS, each network device based on how it is connected in the network and the persona of the network device. Hence, the deployment process can rely on the administrator's knowledge of the persona of each network device. Subsequently, the administrator may identify the topology of the network and configure individual network devices based on the persona of the network device. When the network is complex with different types of network devices (e.g., access and aggregation switches), configuring individual network devices based can be inefficient, cumbersome, and error prone.

To address this problem, the NMS of the network can deploy a DDPI system capable of dynamically identifying the persona of a respective network device in the network. During operation, when a network device onboards with the NMS, the network device can send a discovery packet to the NMS. The discovery packets can be Link Layer Discovery Protocol (LLDP) change notification packets. A respective discovery packet can include a set of discovery information associated with a corresponding network device. The discovery information can include one or more of: a numeric port description, virtual local area network (VLAN) information associated with a respective port, an alpha-numeric name of the network device, an alpha-numeric system description (e.g., a description of the network device's hardware and operating system), system capabilities indicating the layer-2 and layer-3 services supported by the network device, one or more network addresses (e.g., media access control (MAC) and Internet Protocol (IP) addresses) allocated to the network device, and a list of protocols operating on the network device.

When the NMS receives the discovery packet from the network device, the DDPI system can obtain the discovery information and store the information in a database. In some examples, the database can be a graph database, such as ArangoDB. A graph database can be a specialized database that uses edges and nodes of a graph structure for storing data and applying semantic queries to the data. The data in the graph database can be stored based on the Internet Engineering Task Force (IETF) draft on JavaScript Object Notation (JSON) schema. Because the graph database can be used to represent the network based on edges and nodes, the DDPI can use the graph database to classify the network device.

Upon receiving the discovery packets from the network devices of the network, the DDPI system can apply a classification process on the discovery information. The DDPI system can determine the connectivity information from the discovery information. The connectivity information can indicate how each network device is connected to other network devices in the network. Based on the connectivity information of the network, the DDPI system can explore the paths in the network. Exploring the paths can include, from each network device, traversing a path from each connected port of the network device up to a predetermined number of hops. Each path traversal can include exploring a subsequent network device reachable via a link at each hop. The DDPI system can repeat the path traversal for all network devices.

The DDPI system can then determine the number of paths through a network device as a connectivity number for the network device. Therefore, the connectivity number can indicate the number of connections for the network device. Based on the connectivity number, the DDPI system can determine the connectivity tier of individual network devices. The connectivity tier can indicate the placement of the network device in the hierarchy of network devices in the network. For example, the hierarchy of the network devices can include an access tier coupling end devices, an aggregation tier that aggregates traffic from a plurality of access devices, and a core or border tier that can couple the network to an external network (e.g., to a wide-area network or WAN, such as the Internet).

A network device at the access tier typically can communicate with another network device at any tier via the aggregation tier. Therefore, the network devices in the aggregation tier may have the highest number of connections through them. On the other hand, the network devices in the access tier may have a few connections through them. Accordingly, if the connectivity number for a network device is below a threshold, the DDPI system can determine an access tier as the connectivity tier of the network device. Hence, if the network device is a switch, the DDPI system can identify the network device as an access switch. On the other hand, if the connectivity number for the network device is above the threshold, the DDPI system can determine whether the network device is connected to any device in the access tier (e.g., to an access switch). If such a connection exists, the DDPI system can determine an aggregation tier as the connectivity tier of the network device. Otherwise, the DDPI system can determine a core (or border) tier as the connectivity tier of the network device.

The DDPI system may also perform validations based on the respective device profiles of the network devices. The DDPI system may obtain identifying information associated with a network device from a discovery packet and determine the corresponding device profile. The identifying information can include vendor-specific information, such as a model number. The device profile can include a corresponding model number and device capabilities. The DDPI system can identify the device profile by matching the model number obtained from the discovery packet with the identified device profile.

The DDPI system can then use the information in the device profile to validate the allocation of a connectivity tier. For example, if the model number indicates a high-performance device suitable as a core network device, the DDPI system may not determine an access tier for that network device. In the same way, the DDPI system can utilize the device capabilities (e.g., high-capacity ports, multi-band optical transponders, etc.) to determine whether a network device should be at the core tier. Therefore, in addition to the connectivity to the access tier, the DDPI system can check against the device profile and device capabilities to determine whether a network device belongs to an aggregation tier or a core tier.

The DDPI system can also determine additional information for a network device. For example, the DDPI system can determine whether the network device has a direct connection to another network device in the same tier. If the network device has such a connection, the DDPI system can determine that the network device is deployed as a device pair (e.g., a DVS). The DDPI system can select a persona in accordance with the deployment. The DDPI system may maintain one or more predefined personas for each connectivity tier. Based on the connectivity tier and additional information associated with a network device, the DDPI system can select a persona for the network device. The DDPI system can then determine the set of configurations indicated by the persona and "push" the configurations to the device. In this way, the DDPI system can automatically identify the persona of the network device and configurate the network device accordingly.

In this disclosure, the term "switch" is used in a generic sense, and it can refer to any standalone network device or fabric device operating in any network layer. "Switch" should not be interpreted as limiting examples of the present invention to layer-2 networks. Any device that can forward traffic to an external device or another switch can be referred to as a "switch." If the switch is a virtual device, the switch can be referred to as a virtual switch.

Furthermore, if a network device facilitates communication between networks, the network device can be referred to as a gateway device. Any physical or virtual device (e.g., a virtual machine or switch operating on a computing device) that can forward traffic to an end device can be referred to as a "network device." Examples of a "network device" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of a DDPI system discovering respective personas of network devices in a network, in accordance with an aspect of the present application. A network 100 can include a number of network devices, and may include heterogeneous network components, such as layer-2 and layer-3 hops, and tunnels. In some examples, network 100 can be an Ethernet network, InfiniBand network, or other network, and may use a corresponding communication protocol, such as Internet Protocol (IP), FibreChannel over Ethernet (FCoE), or other protocol. Network 100 can include a number of network devices, such as network devices 102, 104, and 106. Network 100 can include other network devices not shown in FIG. 1. A respective network device in network 100 can be associated with a MAC address and an IP address.

In some examples, network 100 can be a distributed tunnel fabric, where the switches can be coupled to each other via tunnels. Network 100 can then also be referred to as fabric 100. In fabric 100, tunnel encapsulation is initiated and terminated within fabric 100. Network devices in fabric 100 may form a mesh of tunnels. Examples of a tunnel can include, but are not limited to, Virtual Extensible Local Area Network (VXLAN), Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in fabric 100 can be formed over an underlay network. The underlay network can be a physical network, and a respective link of the underlying network can be a physical link. A respective switch pair in the underlay network can be a border gateway protocol (BGP) peer. The switches in the underlay network can use the BGP to establish routes via which encapsulated packets of fabric 100 are forwarded in the underlay network. A VPN, such as an EVPN, can be deployed over fabric 100.

In network 100, two or more network devices can operate as a single virtual switch in conjunction with each other to facilitate a DVS. The DVS may operate as the gateway device in network 100 and facilitate external communication for network 100. The DVS can also operate as an access device that connects end devices (or user devices) to network 100. The DVS can be associated with one or more virtual network addresses (e.g., a virtual IP address and/or a virtual MAC address). Consequently, all switches participating in the DVS can be associated with the virtual network addresses. The virtual network addresses allow the participating network devices to facilitate high availability to each other. For example, if one of these network devices becomes unavailable due to a failure or power cycle, the other network device can remain associated with the virtual network addresses and continue to receive and forward packets based on the virtual network addresses.

With existing technologies, to deploy network 100, a user, such as administrator 120, can connect the network devices with each other in network 100. Based on the connections, the network devices of network 100 can onboard with NMS 140. Administrator 120 can then provision and manage the network devices of network 100 via NMS 140. For example, to provision network device 102, administrator 120 can provide a set of configuration parameters (e.g., the VLANs enabled at each port) to network device 120 via a user interface of NMS 140. Administrator 120 can determine the configuration parameters based on how network device 102 is connected in network 100 and the corresponding persona. Hence, the deployment of network device 102 in network 100 can rely on administrator 120's knowledge of the persona of network device 102 and the topology of network 100. If network 100 is complex with different types of network devices, configuring individual network devices in network 100 based can be inefficient, cumbersome, and error prone.

To address this problem, NMS 140 can deploy a DDPI system 150 that can dynamically identify the persona of the network devices in network 100. When network devices of network 100 onboard with NMS 140, they can send corresponding discovery packets 112 to NMS 140 (e.g., via the cloud). Discovery packets 112 can be LLDP change notification packets. A respective packet of discovery packets 112 can include a set of discovery information associated with a corresponding network device. For example, a discovery packet 114 from network device 102 can comprise discovery information associated with network device 102, which can include one or more of: port descriptions of a respective port of network device 102, VLAN information associated with the port, an alpha-numeric name of network device 102, the description of the hardware and operating system of network device 102, system capabilities indicating the layer-2 and layer-3 services supported by network device 102, one or more network addresses (e.g., MAC and IP addresses) allocated to network device 102, and a list of protocols operating on network device 102.

When NMS 140 receives discovery packet 114 from network device 102, a data aggregation process 152 of DDPI system 150 can obtain the discovery information from packet 114 and store the information in a discovery database 132 of DDPI system 150. In some examples, database 132 can be a graph database, such as ArangoDB. In this way, data aggregation process 152 can obtain discovery information 116 from discovery packets 112 from network 100 and store discovery information 116 in database 132. Discovery information 116 can include port information 122 (e.g., description and VLAN of a respective port), route information 124 (e.g., locally determined routes), and system description and capabilities 126 (e.g., a description of the hardware and operating system, and the supported services) associated with each network device.

DDPI system 150 can apply a classification process 154 on discovery information 116 in database 132. Classification process 154 can determine the connectivity information from discovery information 116. The connectivity information can indicate how each network device is connected to other network devices in network 100. Based on the connectivity information of network 100, classification process 154 can explore the paths in network 100. Exploring the paths can include, from each network device, traversing a path from each connected port of the network device up to a predetermined number of hops, X. The value of X can be configured by administrator 120 via an interface 160 of DDPI system 150. Examples of interface 160 can include, but are not limited to, a graphical user interface (GUI), a web interface, a textual interface, a touch-based interface, a gesture-based interface, and a movement-based interface.

Classification process 154 can then determine the number of paths through a network device as a connectivity number for the network device. For example, if N paths within X hops pass through network device 102, the connectivity number of network device 102 can be N. Similarly, if M paths within X hops pass through network device 104, the connectivity number of network device 104 can be M. Hence, the pass-through rates for network devices 102 and 104 can be N and M, respectively. Accordingly, the connectivity number can indicate the number of connections from a network device. Based on the connectivity number, classification process 154 can determine the connectivity tier of individual network devices in network 100. The connectivity tier can indicate the placement of a network device in the hierarchy of network devices, such as access, aggregate, and core device, in network 100.

Typically, in network 100, the aggregation tier may have the highest number of connections through them. In other words, the aggregation tier may have the highest pass-through rate. Here, the pass-through rate can indicate the number of paths passing through a network device. On the other hand, the network devices in the access tier may have a few connections through them. For example, if the connectivity number, N, for network device 102 is below a threshold, classification process 154 can allocate network device 102 to an access tier. The threshold can be a preconfigured value. Similarly, if the connectivity number for network device 106 is below a threshold, classification process 154 can allocate network device 106 to an access tier. On the other hand, if the connectivity number, M, for network device 104 is above the threshold, classification process 154 can determine whether network device 104 is connected to any device in the access tier. If network device 104 is connected to the access tier (e.g., to network device 102), classification process 154 can allocate network device 104 to an aggregation tier. Otherwise, classification process 154 can allocate network device 104 to a core (or border) tier.

DDPI system 150 can include an enhancement process 156 that can perform validations based on device profiles 118 of the network devices in network 100. DDPI system 150 can maintain a device repository 134 (e.g., a relational database) that stores device profiles 118. Device profiles 118 can include the respective model numbers and capabilities of the network devices. DDPI system 150 may obtain identifying information associated with a network device from a discovery packet. The identifying information can include vendor-specific information, such as a model number. DDPI system 150 can identify the device profile by matching the model number obtained from the discovery packet with the identified device profile from repository 134.

DDPI system 150 can use the information in the device profile to validate the allocation of a connectivity tier. For example, if the model number corresponds to network device 104 suitable as a core network device, enhancement process 156 may not determine an access tier for network device 104. In the same way, enhancement process 156 can utilize the device capabilities (e.g., high-capacity ports, multi-band optical transponders, etc.) to determine whether network device 104 should be at the core tier. Therefore, in addition to the connectivity to the access tier, enhancement process 156 can check against device profiles 118 and device capabilities to determine whether network device 104 belongs to an aggregation tier or a core tier.

Classification process 154 can also determine additional information for a network device. For example, classification process 154 can determine whether network device 102 has a direct connection to another network device 106 in the same tier. If network devices 102 and 106 are directly connected, classification process 154 can determine that network devices 102 and 106 are deployed as a device pair (e.g., a DVS). Classification process 154 can select a persona in accordance with the deployment. DDPI system 150 may maintain one or more predefined personas for each connectivity tier in a persona repository 136 (e.g., a data structure). Based on the connectivity tier and additional information associated with a network device, classification process 154 can select a persona for the network device.

Enhancement process 156 can present user interface 160 that can allow administrator 120 to swap a persona if classification process 154 has misclassified the persona or the recommended persona does not match administrator 120's intention. Furthermore, if administrator 120 changes a persona selected by classification process 154, DDPI system 150 can recalculate the threshold accordingly and enhance classification process 154. Once a persona is selected for a network device, configuration process 158 of DDPI system 150 can then determine a set of configurations associated with the persona and "push" the configurations to the network device.

For example, once classification process 154 allocates network device 102 as an access device and selects a corresponding persona 142 from repository 136, configuration process 158 can send the configurations indicated by persona 142 to network device 102. Similarly, when classification process 154 allocates network device 104 as an aggregate device and selects a corresponding persona 144 from repository 136, configuration process 158 can send the configurations indicated by persona 144 to network device 104. In this way, DDPI system 150 can automatically identify the persona of network devices in network 100 and configure the respective personas on the network devices accordingly.

Figure 2:
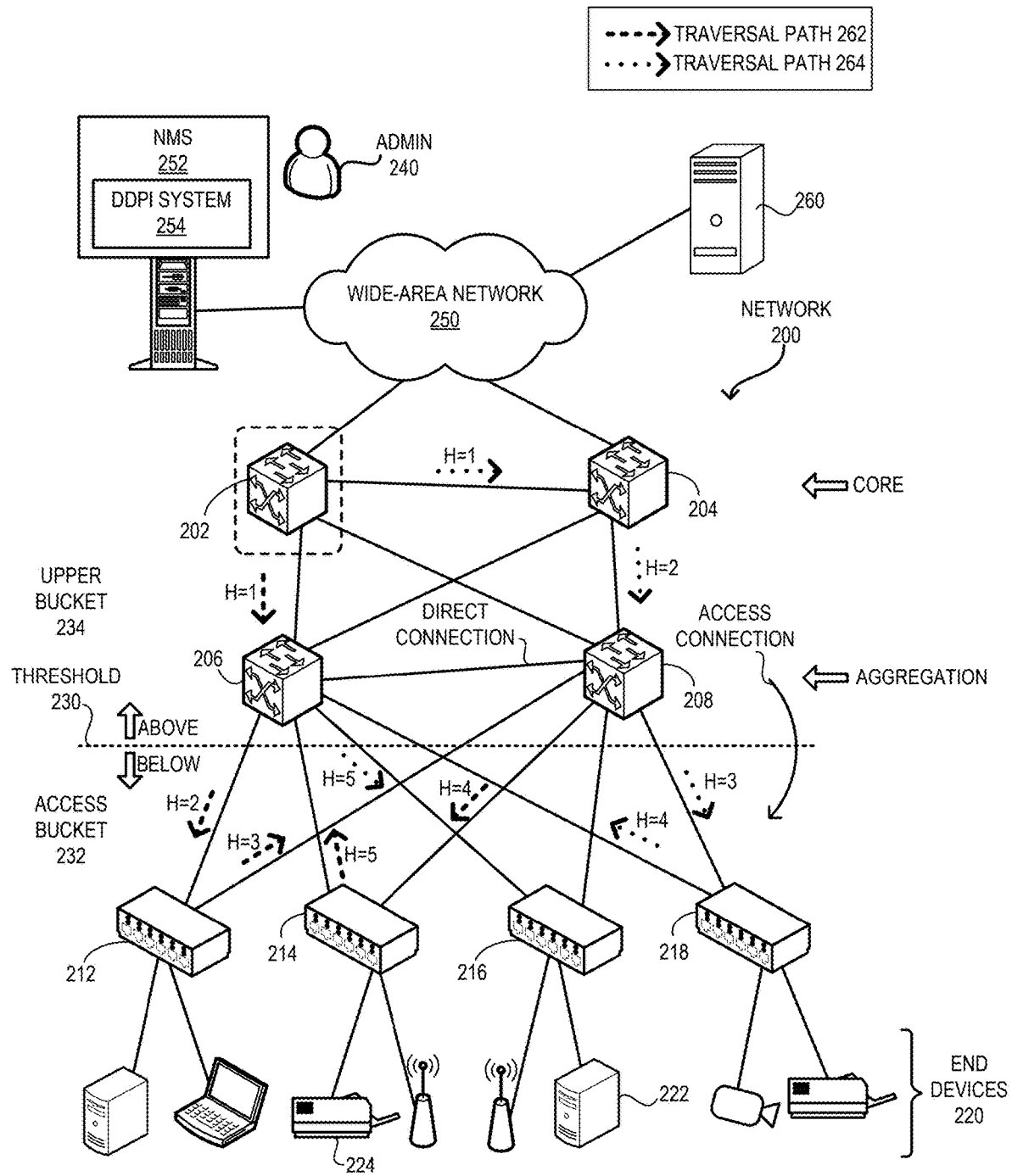
FIG. 2 illustrates an example of a DDPI system determining respective connectivity tiers of network devices in a network, in accordance with an aspect of the present application.

FIG. 2 illustrates an example of a DDPI system determining respective connectivity tiers of network devices in a network, in accordance with an aspect of the present application. A large-scale network 200, such as an enterprise network, can include a number of network devices. Core or border network devices 202 and 204 can couple network 200 with a WAN 250, such as the Internet. A number of end devices 220 can be coupled to network 200 via edge or access network devices 212, 214, 216, and 218. Aggregation network devices 206 and 208 can aggregate traffic from end devices. An NMS 252 reachable via WAN 250 can provision, configure, and manage network 200. To efficiently identify the respective personas of the network devices of network 200, a DDPI system 254 can be deployed (e.g., in conjunction with NMS 252).

In network 200, traffic to and from end devices 220 can traverse through network devices 206 and 208 for both north-south (e.g., to and from WAN 250) and east-west (e.g., between end devices) traffic flows. For example, traffic from a network server 260, such as a web server, to end device 222 can be forwarded via network device 202 or 204, and subsequently via network device 206 or 208. On the other hand, traffic from end device 222 to end device 224 is also forwarded via network device 206 or 208. Consequently, network devices 206 and 208 may have the highest pass-through rates in network 200 followed by the pass-through rates of network devices 202 and 204. Inversely, network devices 212, 214, 216, and 218 can have relatively lower pass-through rates.

Based on this traffic pattern, DDPI system 254 can determine the respective connectivity numbers of the network devices of network 200. When the network devices of network 200 onboard with NMS 252, these network devices can provide their discovery information to NMS 252. NMS 252 can determine how each network device is connected to other network devices in network 200. NMS 252 can apply a topology generation service on the discovery information to determine the connectivity information. DDPI system 254 can then explore the paths in network 200 from each network device up to a predetermined number of hops. In the example of FIG. 2, the value of the predetermined number of hops can be five. The value can be configured by administrator 240 via an interface of DDPI system 254 based on the topology and tiering of network 200 and the efficiency of execution. For example, if the paths are longer, DDPI system 254 may traverse more devices and cause inefficient execution.

DDPI system 254 can then determine the number of paths that include a network device as a connectivity number for the network device. For example, if N paths within five hops are traversed through network device 206, the connectivity number of network device 206 can be N. DDPI system 254 can repeat the exploration of paths from a respective network device in network 200. For example, DDPI system 254 can select an initial or source network device, such as network device 202 (denoted with a dashed-line enclosure), and start the exploration from network device 202. The next hop of network device 202 can be network device 204 or 206. A traversal path 262 from network device 202 can include network device 206 as the first hop (H=1). Here, H can indicate the hop count from network device 202. Another traversal path 264 can include network device 204 as the first hop (H=1).

After network device 206, traversal path 262 can have five possible network devices for the next hop. Among the five possible network devices, DDPI system 254 can select network device 212. The selection can be based on one or more selection criteria (e.g., round-robin or random selection). Even though traversal path 262 can include network device 212 as the second hop (H=2), DDPI system 254 explores respective paths through all five possible network devices as the second hop. In this way, DDPI system 254 can explore all possible paths from network device 202. Traversal path 262 can subsequently include network devices 208, 214, and 206 (H=3, 4, and 5, respectively) as the subsequent hops until the five-hop limit is reached. In accordance with traversal path 262, DDPI system 254 can increment the connectivity numbers of network device 202 to one.

On the other hand, after network device 204, traversal path 264 can include network device 208 (H=2). Traversal path 264 can then have five possible network devices for the next hop, each of which can be explored by DDPI system 254. Traversal path 264 can subsequently include network devices 218, 206, and 216 (H=3, 4, and 5, respectively) as the subsequent hops until the five-hop limit is reached. In accordance with traversal path 264, DDPI system 254 can increment the connectivity numbers of network device 202 to two. By repeating this process for all possible paths from network device 202, DDPI system 254 can incorporate the number of connections originating at network device 202 into the connectivity numbers of corresponding network devices. Here, each path can include five edges, and each edge in the path can be labeled with a unique key in a sorted combination of the corresponding device identifiers. For example, the edge between network devices 202 and 206 can be identified by the identifier pairs of network devices 202 and 206. The identifier can be a network address, such as an IP or a MAC address.

DDPI system 254 can use a bucketing algorithm to classify network devices of network 200 by comparing respective connectivity numbers with a threshold 230. DDPI system 254 can dynamically determine the value of threshold 230. Threshold 230 may also be configured by an administrator. To dynamically determine the value of threshold 230, DDPI system 254 can sum the connectivity numbers of all network devices in network 200 and divide the result of summation by the number of network devices in network 200. DDPI system 254 may adjust the value of threshold 230 based on an adjustment value. The adjustment value can be a value between zero and one, and may be multiplied to the result of the division.

Using the bucketing algorithm, DDPI system 254 can then identify the network devices with connectivity numbers below threshold 230 and place them in an access bucket 232. DDPI system 254 can place the rest of the network devices in an upper bucket 234. Subsequently, DDPI system 254 can classify the network devices in bucket 232 to the access (or edge) tier. Among the network devices in bucket 234, DDPI system 254 can determine which network devices are connected to at least one network device in bucket 232 (i.e., has an access connection) and classify them to the aggregation tier. DDPI system 254 can then place the rest of the network devices in bucket 234 to the core (or border) tier.

DDPI system 254 can also determine which network devices in network 200 have direct connections within the same tier. For example, DDPI system 254 can determine that network device 206 has a direct connection to another network device 208 in the same tier. Since network devices 206 and 208 are directly connected, DDPI system 254 can determine that network devices 206 and 208 are deployed as a device pair (e.g., a DVS). DDPI system 254 can select a persona for network devices 206 and 208 that can allow them to operate as a high-availability switch pair. In other words, the persona selected for network devices 206 and 208 can incorporate configurations that allow them to operate in the aggregation tier while operating in a high-availability device pair. Hence, for the same tier, DDPI system 254 may maintain multiple personas and can select the one that matches the tier as well as additional relevant information (e.g., presence in a DVS).

Figure 3:
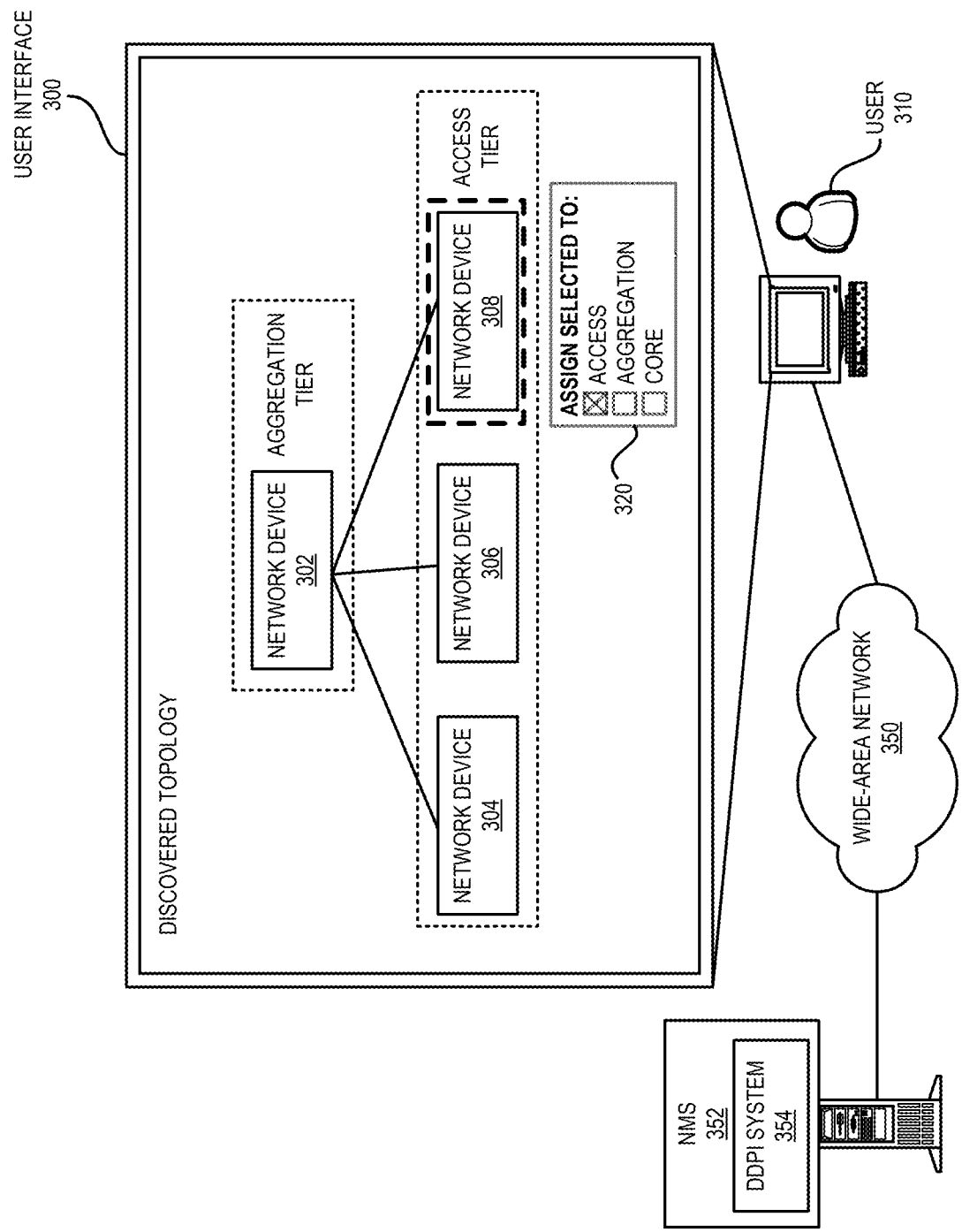
FIG. 3 illustrates an example of a user interface of a DDPI system for enhancing the connectivity tier selection of network devices in a network, in accordance with an aspect of the present application.

FIG. 3 illustrates an example of a user interface of a DDPI system for enhancing the connectivity tier selection of network devices in a network, in accordance with an aspect of the present application. A DDPI system 354, in conjunction with an NMS 352, can present a user interface 300. Examples of interface 300 can include, but are not limited to, a GUI, a web interface, a textual interface, a touch-based interface, a gesture-based interface, and a movement-based interface. A user 310 (e.g., an administrator) may access user interface 300 via a WAN 350 (e.g., via the Internet). Interface 300 can present a topology discovered by NMS 352 and the corresponding tiers assigned DDPI system 354 to user 310.

For example, the discovered topology of a network can comprise network devices 302, 304, 306, and 308. DDPI system 354 can assign network device 302 to an aggregation tier, and network device 304, 306, and 308 to an access tier. Interface 300 can allow user 310 to swap the persona (i.e., the allocated tier) if DDPI system 354 has misclassified a network device or the recommended tier does not match user 310's intention. For example, if user 310 selects a network device, such as network device 308 (denoted with a dashed enclosure), a tier selection interface 320 (e.g., a pop-up window) can appear on interface 300. Interface 320 can include the recommended tier preselected and can support the option for user 310 to select another tier. For example, for network device 308, the access tier can be preselected in interface 320. User 310 can select another tier, such as the aggregation or core tier, for network device 308 via interface 320.

Figure 4A:
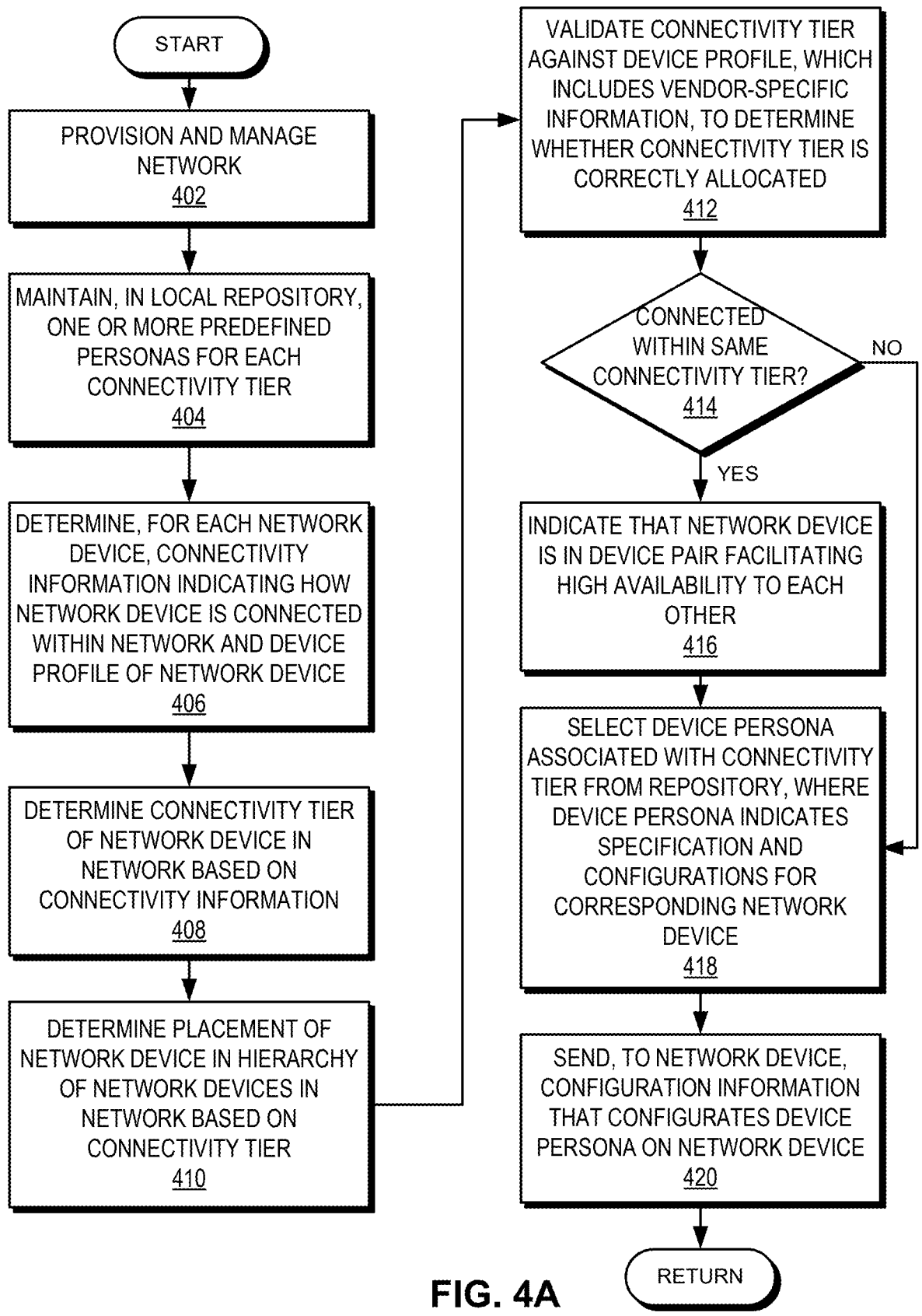
FIG. 4A presents a flowchart illustrating an example of a process of a network management system (NMS) dynamically identifying device persona in a network, in accordance with an aspect of the present application.

FIG. 4A presents a flowchart illustrating an example of a process of an NMS dynamically identifying device persona in a network, in accordance with an aspect of the present application. During operation, the NMS can provision and manage a network (operation 402). The provisioning can include configurating the network devices of the network. To facilitate the configurations to the network devices, the NMS can maintain, in a local repository, one or more predefined personas for each connectivity tier (operation 404). For example, the NMS can maintain respective personas for access, aggregation, and core tiers. Furthermore, at each tier, the NMS may maintain multiple personas.

To classify the network devices, the NMS can determine, for each network device, connectivity information indicating how the network device is connected within the network. The NMS can also determine a device profile of the network device (operation 406). The device profile can indicate the capabilities of the network device. For example, the device profile can include the model number of the network device based on which the NMS can determine the capabilities. The NMS can determine a connectivity tier of the network device in the network based on the connectivity information (operation 408). By determining the connectivity tier, the NMS can determine the placement of the network device in the hierarchy of network devices in the network based on the connectivity tier (operation 410).

The NMS can apply a bucketing algorithm to identify the network devices in the access tier. If the connectivity number of a network device is below a threshold, the NMS can assign the access tier to the network device. The NMS can also identify the network devices in the aggregation and core tiers based on the connectivity to the access tier. In this way, the NMS can automatically determine a connectivity tier. The NMS can then validate the connectivity tier against the device profile, which includes vendor-specific information (e.g., a model number), to determine whether the connectivity tier is correctly allocated (operation 412). For example, if the NMS determines, based on the device profile, that a network device is a high-capacity device, the network device may not be allocated to the access tier. The NMS can then determine whether the network device is connected within the same connectivity tier (e.g., has a link within the same tier) (operation 414).

If the network device is connected within the same connectivity tier, the NMS can indicate that the network device is in a device pair facilitating high availability to each other (operation 416). The direct connection can be an inter-switch link (ISL) via which a network device can detect the unavailability and facilitate a failover accordingly. If the network device is not connected within the same connectivity tier (operation 414) or upon indicating the high availability (operation 416), the NMS can select a device persona associated with the connectivity tier from the repository, where the device persona indicates the specification and configurations for the corresponding network device (operation 418). The NMS can then send, to the network device, configuration information that configurates the device persona on the network device (operation 420).

Figure 4B:
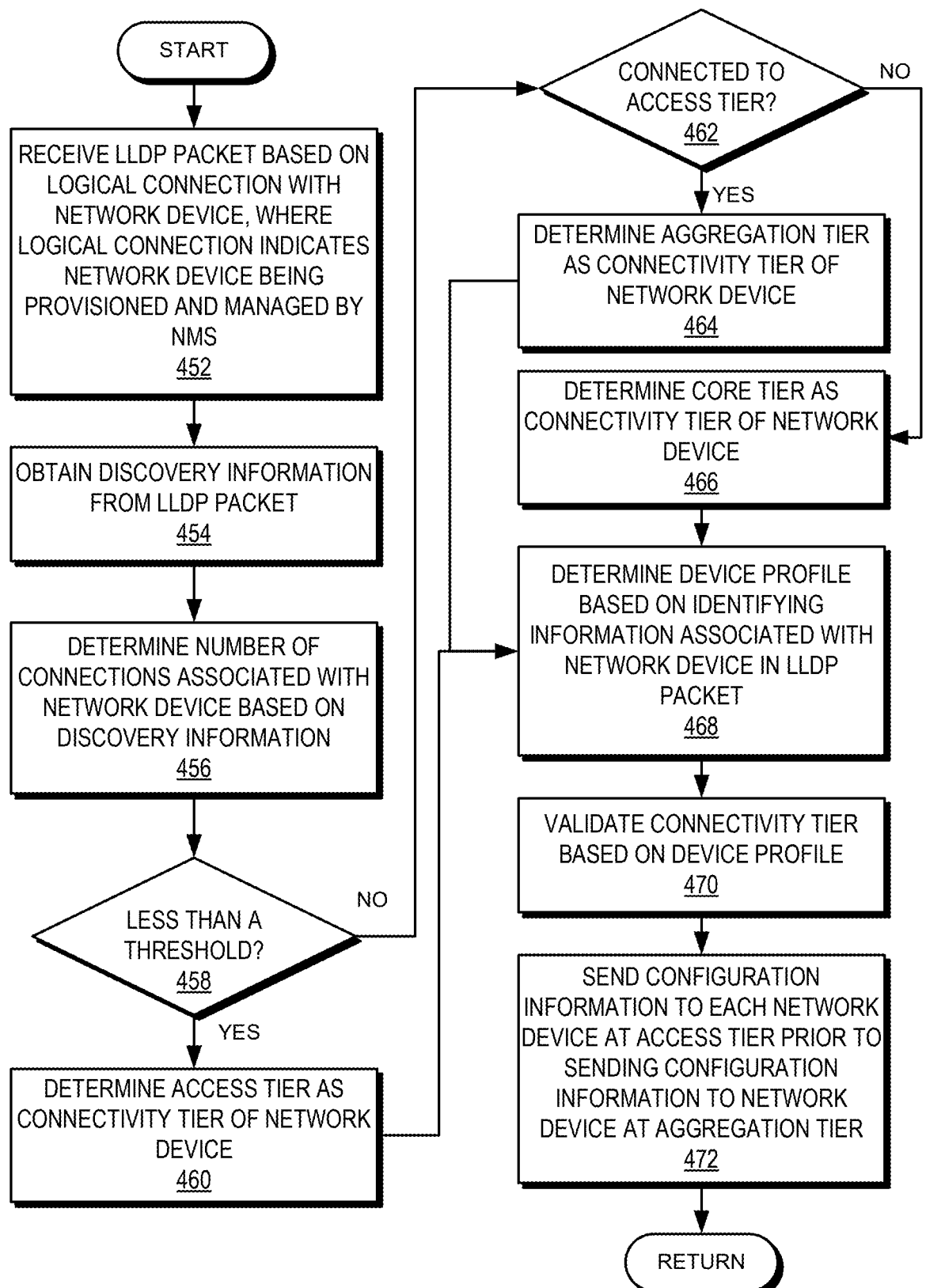
FIG. 4B presents a flowchart illustrating an example of a process of an NMS determining respective connectivity tiers of network devices in a network, in accordance with an aspect of the present application.

FIG. 4B presents a flowchart illustrating an example of a process of an NMS determining respective connectivity tiers of network devices in a network, in accordance with an aspect of the present application. During operation, the NMS can receive an LLDP packet based on a logical connection with a network device. Here, the logical connection indicates the network device being provisioned and managed by the NMS (operation 452). The logical connection with the NMS indicates that the network device has been onboarded to the NMS. Accordingly, the NMS can receive the LLDP packet comprising discovery information associated with the network device. The NMS can then obtain the discovery information from the LLDP packet (operation 454).

The NMS can determine the number of connections associated with the network device based on the discovery information (operation 456). The NMS can explore the paths within a predetermined number of hops from each network device of the network. The NMS can determine the number of paths passing through the network device as the connectivity number. The NMS can then determine whether the connectivity number is less than a threshold (operation 458). If the connectivity number is less than a threshold, the NMS can determine an access tier as the connectivity tier of the network device (operation 460).

If the connectivity number is not less than the threshold (i.e., greater than or equal to the threshold), the NMS can also determine whether the network device is connected to the access tier (operation 462). The connectivity to the access tier indicates that the network device is to aggregate traffic from the access-tier network devices. Accordingly, if the network device is connected to the access tier, the NMS can determine an aggregation tier as the connectivity tier of the network device (operation 464). On the other hand, if the network device is not connected to the access tier, the placement of the network device can be beyond the aggregation tier within the hierarchy of the network devices in the network. Hence, the NMS can determine a core tier as the connectivity tier of the network device (operation 466).

Upon determining the connectivity tier (operation 460, 464, or 466), the NMS can determine the device profile based on the identifying information associated with the network device in the LLDP message (operation 468). The LLDP packet can include vendor-specific information, such as a model number of the network device. The NMS can match the model number in the LLDP packet with the model number in the device profile and select the device profile for the network device. The NMS can then validate the connectivity tier based on the device profile (operation 470). For example, if the device indicates a high-capacity network device, the NMS may not allocate the network device to an access tier. The NMS can then send the configuration information to each network device at the access tier prior to sending the configuration information to a network device in the aggregation tier (operation 472). In this way, the NMS can configurate the network device from a bottom-up approach.

Figure 5:
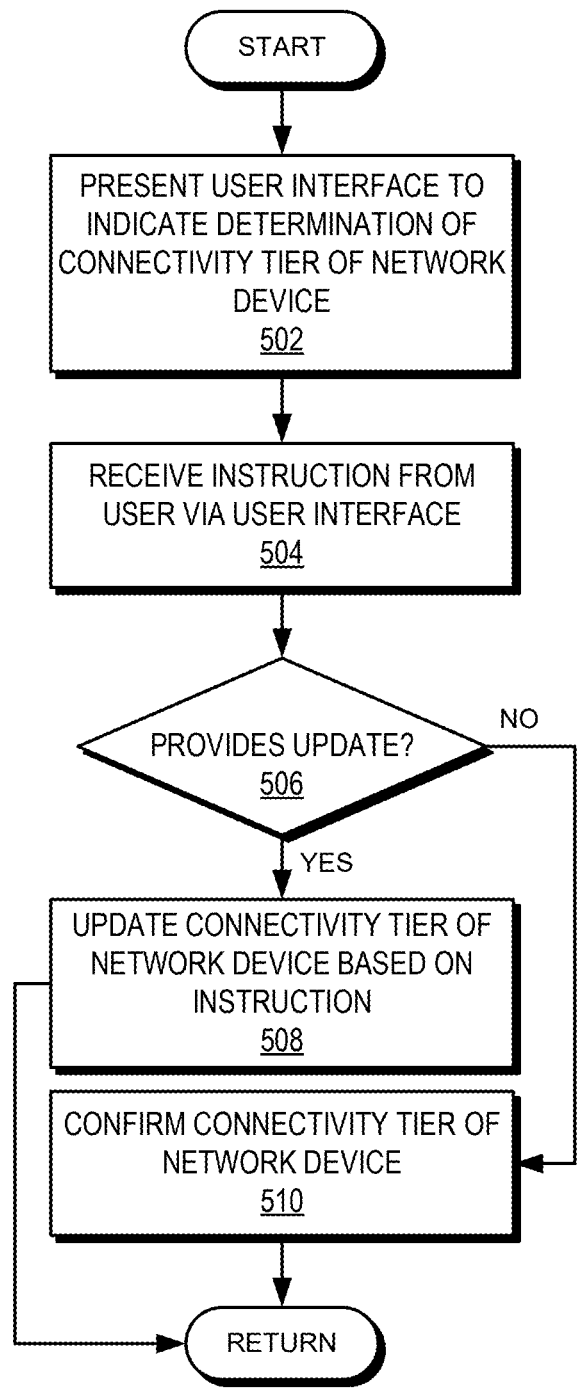
FIG. 5 presents a flowchart illustrating an example of a process of an NMS enhancing the connectivity tier selection of network devices in a network, in accordance with an aspect of the present application.

FIG. 5 presents a flowchart illustrating an example of a process of an NMS enhancing the connectivity tier selection of network devices in a network, in accordance with an aspect of the present application. During operation, the NMS can present a user interface to indicate the determination of a connectivity tier of a network device (operation 502). The user interface can present the determined topology of the network and the connectivity tier allocated to each of the network devices. The topology can show the hierarchy of the network devices in the network. The NMS can receive an instruction from a user via the user interface (operation 504). The instruction can be an updated selection of a connectivity tier for a network device of the network. The instruction can also be a confirmation of a recommended connectivity tier.

Accordingly, the NMS may determine whether the instruction provides an update (operation 506). If the instruction provides an update, the NMS can update the connectivity tier of the network device based on the instruction (operation 508). For example, if the recommended connectivity tier is an aggregation tier, and the instruction updates it to an access tier, the NMS can update the connectivity tier of the network device to the aggregation tier. On the other hand, if the instruction does not provide an update, the instruction can be the confirmation of the recommended connectivity tiers. The NMS can then confirm the connectivity tier of the network device (operation 510).

Figure 6:
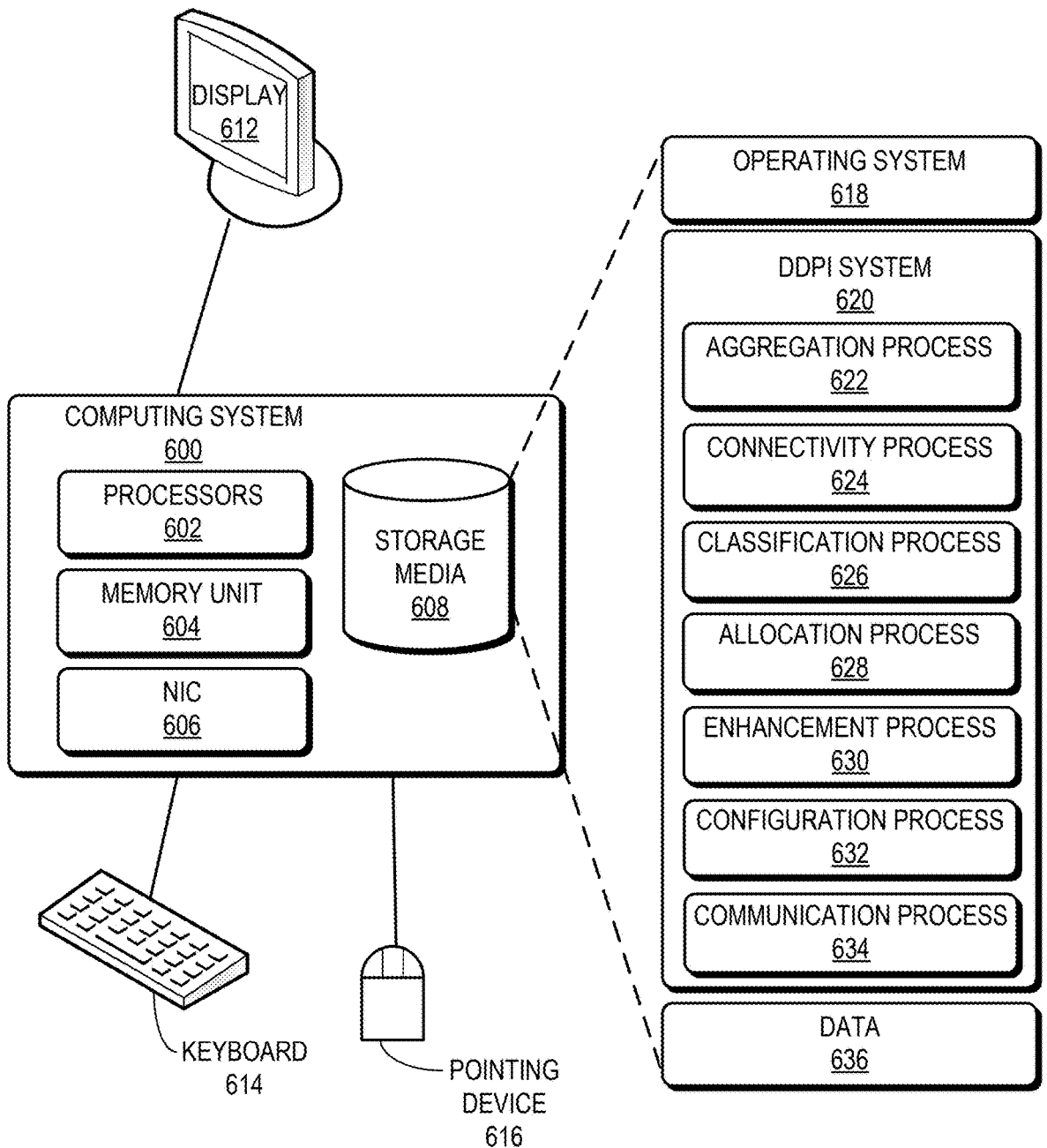
FIG. 6 illustrates an example of a computing system facilitating DDPI in a network, in accordance with an aspect of the present application.

FIG. 6 illustrates an example of a computing system facilitating DDPI in a network, in accordance with an aspect of the present application. A computing system 600 can include a set of processors 602, a memory unit 604, a NIC 606, and a storage media 608. Memory unit 604 can include a set of volatile memory devices (e.g., dual in-line memory module (DIMM)). Furthermore, computing system 600 may be coupled to a display device 612, a keyboard 614, a pointing device 616, if needed, and a network interface card (NIC) 606. Storage media 608 can store an operating system 618 and a DDPI system 620. DDPI system 620 can be deployed in conjunction with an NMS running on computing system 600.

DDPI system 620 can include instructions, which when executed by computing system 600, can cause computing system 600 to perform methods and/or processes described in this disclosure. Specifically, DDPI system 620 can include instructions for aggregating discovery information from the discovery packets received from the network devices of a network (aggregation process 622). DDPI system 620 can also include instructions for determining how the network devices of the network are connected to each other (connectivity process 624). Hence, DDPI system 620 can include instructions for determining the topology of the network, which indicates the hierarchy of the network devices in the network (connectivity process 624).

In addition, DDPI system 620 can include instructions for classifying the network devices into corresponding connectivity tiers (e.g., based on a bucketing algorithm) (classification process 626). Moreover, DDPI system 620 can include instructions for allocating respective personas to the network devices in accordance with the connectivity tiers (allocation process 628). DDPI system 620 can also include instructions for enhancing the determination of the connectivity tiers (e.g., by presenting an interface and receiving feedback from a user via the interface) (enhancement process 630).

Moreover, DDPI system 620 can also include instructions for configurating the network devices based on the configurations indicated by corresponding (e.g., by generating instruction packets comprising the configurations) (configuration process 632). Furthermore, DDPI system 620 can include instructions for sending and receiving packets (e.g., receiving the discovery packets and sending the instruction packets) (communication process 634). Data 636 can include any data that can facilitate the operations of DDPI system 620. Data 636 can include, but is not limited to, discovery information, a set of device profiles, predetermined personas, and information indicating the allocation of connectivity tiers and personas.

Figure 7:
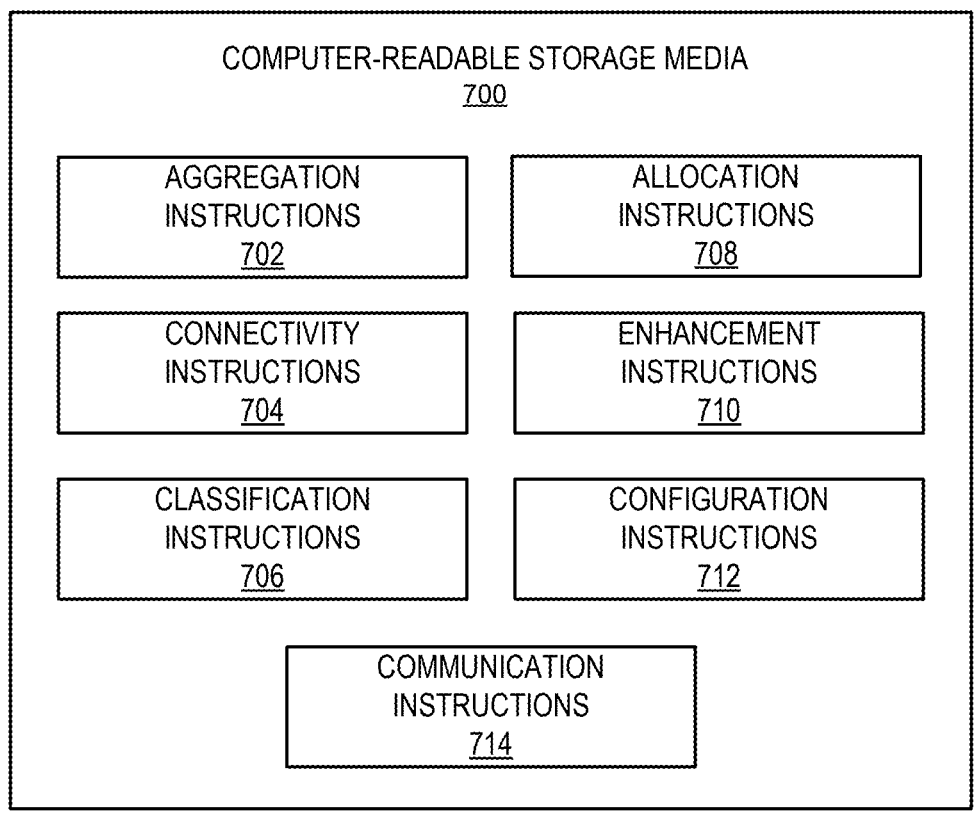
FIG. 7 illustrates an example of a non-transitory computer-readable storage medium that facilitates DDPI in a network, in accordance with an aspect of the present application.

FIG. 7 illustrates an example of a non-transitory computer-readable storage medium that facilitates DDPI in a network, in accordance with an aspect of the present application. Computer-readable storage media 700 can comprise a plurality of instruction sets, when executed by processing resources, can perform functions or operations similar to processes 622-634 of DDPI system 620 of FIG. 6. Specifically, storage media 700 can include aggregation instructions 702; connectivity instructions 704, classification instructions 706; allocation instructions 708; enhancement instructions 710; configuration instructions 712; and communication instructions 714, which can correspond to processes 622-634, respectively, of DDPI system 620 of FIG. 6.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide an NMS that can provision and manage a network. During operation, the NMS can determine, for a respective network device in the network, connectivity information indicating how the network device is connected within the network and a device profile of the network device. The NMS can then determine a connectivity tier of the network device in the network based on the connectivity information. The connectivity tier can correspond to a placement of the network device in a hierarchy of network devices in the network. The NMS can select a device persona associated with the connectivity tier. Here, the device persona indicates specification and configurations for the network device. The NMS can send, to the network device, configuration information that configurates the device persona on the network device.

In a variation on this aspect, the NMS can determine the connectivity information and the device category by receiving an LLDP packet based on a logical connection with the network device and obtaining discovery information from the LLDP packet. The NMS can also determine the connectivity information based on the discovery information and determine the device profile based on identifying information associated with the network device in the LLDP packet.

In a variation on this aspect, the NMS can determine the connectivity tier of the network device by determining a number of connections associated with the network device and determining an access tier as the connectivity tier of the network device if the number of connections is less than a threshold.

In a further variation, if the number of connections is greater than the threshold, the NMS can determine whether the network device is connected to the access tier. If the network device is connected to the access tier, the NMS can determine an aggregation tier as the connectivity tier of the network device. On the other hand, if the network device is not connected to the access tier, the NMS can determine a core tier as the connectivity tier of the network device.

In a further variation, the NMS can send configuration information to a respective network device at the access tier prior to sending configuration information to a network device at the aggregation tier.

In a variation on this aspect, the NMS can validate the connectivity tier against the device profile of the network device to determine whether the connectivity tier is correctly allocated. The device profile can comprise vendor-specific information.

In a variation on this aspect, the NMS can determine that the network device is connected to another network device at the same connectivity tier. The NMS can then select the device persona to indicate that the network device is in a device pair facilitating high availability to each other.

In a variation on this aspect, the NMS can maintain, in a repository at the NMS, one or more predefined personas for a respective connectivity tier. The NMS can then select the persona for the network device from the repository based on the connectivity tier of the network device.

In a variation on this aspect, the NMS can present, on a user interface of the NMS, the determination of the connectivity tier of the network device. The NMS can then receive, from a user via the user interface, an instruction to change the connectivity tier for the network device.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
    determining, by a network management system for a network device in a network, connectivity information indicating how the network device is connected within the network and a device profile of the network device, wherein the network management system comprises a hardware processor and is to provision and manage the network, and wherein the connectivity information comprises a connectivity number representing how many connections the network device has to other network devices;
    determining, by the network management system, a connectivity tier of the network device in the network based on comparing the connectivity number to a threshold, wherein the connectivity tier corresponds to a placement of the network device in a hierarchy of network devices in the network;
    selecting, by the network management system, a device persona associated with the connectivity tier, wherein the device persona indicates a configuration for the network device; and
    sending, by the network management system to the network device, configuration information that configures the network device based on the device persona.

2. The method of claim 1, wherein the determining of the connectivity information comprises:
    receiving, by the network management system, a Link Layer Discovery Protocol (LLDP) packet based on a logical connection with the network device, wherein the logical connection indicates the network device being provisioned and managed by the network management system,
    obtaining discovery information from the LLDP packet, and
    determining the connectivity information based on the discovery information.

3. The method of claim 1, wherein the determining of the connectivity information for the network device comprises:
    exploring paths in the network from the network device to the other network devices, and
    computing the connectivity number based on identifying how many paths reach the other network devices from the network device.

4. The method of claim 1, further comprising:
    based on determining that the connectivity number is less than the threshold, determining an access tier as the connectivity tier of the network device.

5. The method of claim 4, further comprising:
    based on determining that the connectivity number is above the threshold, determining whether the network device is connected to the access tier; and
    based on determining that the network device is connected to the access tier, determining an aggregation tier as the connectivity tier of the network device.

6. The method of claim 1, further comprising validating the connectivity tier against the device profile of the network device to determine whether the connectivity tier is correctly allocated, wherein the device profile comprises vendor-specific information for the network device.

7. The method of claim 1, further comprising:
    determining that the network device is connected to another network device at the same connectivity tier; and
    selecting the device persona to indicate that the network device is in a device pair facilitating high availability to each other.

8. The method of claim 5, further comprising:
    based on determining that the network device is not connected to the access tier, determining a core tier as the connectivity tier of the network device.

9. The method of claim 3, wherein the exploring of the paths comprises:
    traversing the paths in the network that are within a specified number of hops from the network device to the other network devices.

10. A non-transitory computer-readable storage medium storing instructions that when executed cause a network management system comprising a hardware processor to:
    determine, for a network device in a network, connectivity information indicating how the network device is connected within the network, wherein the network management system provisions and manages the network, and wherein the connectivity information comprises a connectivity number representing how many connections the network device has to other network devices;
    determine a connectivity tier of the network device in the network based on comparing the connectivity number to a threshold, wherein the connectivity tier corresponds to a placement of the network device in a hierarchy of network devices in the network;
    select a device persona associated with the connectivity tier, wherein the device persona indicates a configuration for the network device; and send, from the network management system to the network device, configuration information that configures the network device based on the device persona.

11. The non-transitory computer-readable storage medium of claim 10, wherein the determining of the connectivity information comprises:
receiving a Link Layer Discovery Protocol (LLDP) packet based on a logical connection with the network device, wherein the logical connection indicates the network device being provisioned and managed by the network management system,
obtaining discovery information from the LLDP packet, and
determining the connectivity information based on the discovery information.

12. The non-transitory computer-readable storage medium of claim 10, wherein the determining of the connectivity information for the network device comprises:
exploring paths in the network from the network device to the other network devices, and
computing the connectivity number based on identifying how many paths reach the other network devices from the network device.

13. The non-transitory computer-readable storage medium of claim 12, wherein the exploring of the paths comprises:
traversing the paths in the network that are within a specified number of hops from the network device to the other network devices.

14. The non-transitory computer-readable storage medium of claim 10, wherein the instructions when executed cause the network management system to:
based on determining that the connectivity number is less than the threshold, determine an access tier as the connectivity tier of the network device.

15. The non-transitory computer-readable storage medium of claim 10, wherein the instructions when executed cause the network management system to validate the connectivity tier against a device profile of the network device to determine whether the connectivity tier is correctly allocated, wherein the device profile comprises information of device capabilities of the network device.

16. The non-transitory computer-readable storage medium of claim 10, wherein the instructions when executed cause the network management system to:
determine that the network device is connected to another network device at the same connectivity tier; and
select the device persona to indicate that the network device is in a device pair facilitating high availability to each other.

17. The non-transitory computer-readable storage medium of claim 14, wherein the instructions when executed cause the network management system to:
based on determining that the connectivity number is above the threshold, determine whether the network device is connected to the access tier; and
based on determining that the network device is connected to the access tier, determine an aggregation tier as the connectivity tier of the network device.

18. The non-transitory computer-readable storage medium of claim 10, wherein the instructions when executed cause the network management system to:
present, on a user interface of the network management system, the connectivity tier of the network device; and
receive, via the user interface, an instruction to change the connectivity tier for the network device.

19. A computer system comprising:
a processor; and
a non-transitory machine-readable medium comprising instructions executable on the processor to:
provision and manage a network comprising a plurality of network devices;
determine, for a network device in the network, connectivity information indicating how the network device is connected within the network, wherein the connectivity information comprises a connectivity number representing how many connections the network device has to other network devices;
determine a connectivity tier of the network device in the network based on comparing the connectivity number to a threshold, wherein the connectivity tier corresponds to a placement of the network device in a hierarchy of the plurality of network devices;
select a device persona associated with the connectivity tier, wherein the device persona indicates a configuration for the network device; and
send, to the network device, configuration information that configures the network device based on the device persona.

20. The computer system of claim 19, wherein the determining of the connectivity information for the network device comprises:
exploring paths in the network from the network device to the other network devices, and
computing the connectivity number based on identifying how many paths reach the other network devices from the network device.

* * * * *